US008898317B1

(12) United States Patent
Armstrong et al.

(10) Patent No.: US 8,898,317 B1
(45) Date of Patent: Nov. 25, 2014

(54) COMMUNICATIONS SYSTEM AND RELATED METHOD OF DISTRIBUTING MEDIA

(75) Inventors: Ashley Armstrong, Huntsville, AL (US); Daniel Weatherford, Toney, AL (US); Jason Amos, Albertville, AL (US)

(73) Assignee: Adtran, Inc., Huntsville, AL (US)

( * ) Notice: Subject to any disclaimer, the term of this patent is extended or adjusted under 35 U.S.C. 154(b) by 829 days.

(21) Appl. No.: 12/629,159

(22) Filed: Dec. 2, 2009

(51) Int. Cl.
*G06F 15/16* (2006.01)

(52) U.S. Cl.
USPC .......................................... 709/228; 709/230

(58) Field of Classification Search
USPC .................................. 709/227, 228, 230, 231
See application file for complete search history.

(56) References Cited

U.S. PATENT DOCUMENTS

| | | | |
|---|---|---|---|
| 6,947,417 B2 | 9/2005 | Laursen et al. | 370/389 |
| 7,012,888 B2 * | 3/2006 | Schoeneberger et al. | 370/217 |
| 7,586,857 B2 | 9/2009 | Ejzak et al. | 370/260 |
| 2006/0239257 A1 | 10/2006 | Banner et al. | 370/356 |
| 2007/0047518 A1 * | 3/2007 | Lin | 370/352 |
| 2008/0086566 A1 * | 4/2008 | Kumarasamy et al. | 709/227 |
| 2008/0117839 A1 | 5/2008 | Raju et al. | 370/261 |
| 2008/0212499 A1 * | 9/2008 | Maes | 370/265 |
| 2009/0110132 A1 * | 4/2009 | Kondrad et al. | 375/354 |
| 2009/0143029 A1 * | 6/2009 | Matsumoto et al. | 455/90.2 |
| 2010/0009674 A1 * | 1/2010 | Sapkota et al. | 455/426.1 |

* cited by examiner

*Primary Examiner* — Brian J Gillis
(74) *Attorney, Agent, or Firm* — Fish & Richardson P.C.

(57) ABSTRACT

A communications system and associated method distributes media in a communications network. A Session Initiation Protocol (SIP) communication session call is established between a caller and a communications server. A message is transmitted from the communications server to the media server that includes Session Description Protocol (SDP) parameters for media provided by the media server. Media is delivered to the caller in a packet format in accordance with the Real Time Transport Protocol (RTP) to reuse the same socket as the source IP and port numbers and update RTP timestamps and sequence numbers. The media is transferred to the caller with minimal jitter buffer flushes and network resource usage.

14 Claims, 4 Drawing Sheets

COMMUNICATIONS SYSTEM AND RELATED METHOD OF DISTRIBUTING MEDIA

FIELD OF THE INVENTION

This invention relates to communications systems, and more particularly, this invention relates to distributing media in a communications system.

BACKGROUND OF THE INVENTION

Phone switches often provide callers with specific targeted media that originates from a media server as a separate device from the phone switch. The targeted media could include music-on-hold or sales-on-hold when the caller is connected in a queue. To transmit the same data to multiple endpoints of a Voice over Internet Protocol (VoIP) or a traditional analog or time division multiplex (TDM) endpoint, it is desirable to minimize the network and switch resources used in the process of transferring the targeted media. This is performed typically with a media server where the endpoint media stream is renegotiated to a different connection point. This renegotiation often causes jitter buffer flushes and audio delays, which are often exacerbated by the delays associated with the packetized networks and with the buffers.

There is also a certain amount of communications network "slop" at the network that impacts how the packets arrive. Packets may not arrive as they would, for example, in a TDM or ATM (Asynchronous Transfer Mode) network. Another technical problem is sometimes associated with the communications network when a session begins between the caller and a communications server that establishes the communications. This technical problem occurs because the timestamp and sequence numbers each start with semi-random numbers. If the communications system wants to switch the audio the caller is hearing to another data stream without renegotiating the communications session, the Real Time Transport (RTP) headers should be modified to maintain the timestamp and sequence numbers synchronized with the current numbering between the communications server and the caller.

SUMMARY OF THE INVENTION

In accordance with a non-limiting example, a communications system and associated method distribute media in a communications network and in one aspect uses Voice over Internet Protocol (VoIP) communications. A Session Initiation Protocol (SIP) communication session call is established between a caller (for example, a user of a phone device) and the communications server. A message is transmitted from the communications server to a media server. This message is preferably a proprietary message and includes Session Description Protocol (SDP) parameters for media provided by the media server. The session is implemented and media delivered to the user in a packet format in accordance with the Real Time Transport Protocol (RTP) to reuse the same network socket as the source IP and port numbers and update the RTP timestamps and sequence numbers. As a result, the media is transferred to the caller with minimal jitter buffer flushes and network resource usage.

Throughout this description, the term communications server is generally referring to many different devices that switch, establish and/or transmit calls, including switches and Private Branch Exchanges (PBX's). In one aspect, the communications server is configured to transmit the message to the media server without an SIP re-invite command. In another aspect, the communications server comprises a call queue and the communications server is configured to queue the call from the user within the call queue. In another aspect, the media to be communicated comprises data representative of music-on-hold or sales-on-hold data.

In yet another aspect, the communications server is formed as an integrated communications platform having Private Branch Exchange (PBX), Virtual Private Network (VPN), and Voice over IP (VoIP) switch/routing functionality. The media server in one aspect is integrated with this integrated communications platform.

In yet another aspect, the communications server is configured to transmit a proprietary message to the media server that comprises the SDP parameters for media provided by the media server. This proprietary message is not a re-invite message.

In one aspect, the proprietary message comprises a data field comprising a last sequence number for the RTP packet. In yet another aspect, the proprietary message comprises a data field comprising a last timestamp for the RTP packet. The proprietary message in another example comprises a data field comprising a real time and last time as to when the RTP packet was sent. In yet another aspect, the proprietary message comprises a data field comprising a version and message type for the RTP packet. A communications server is configured to determine how much to increment a last RTP timestamp the media server was provided and increment the last timestamp.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example, a communications system and associated method takes advantage of the implementation of media termination that provides prompts and combines with the system media, for example, data representative of music-on-hold or sales-on-hold. The system and method as described allow seamless reuse of the same network socket (source IP and port numbers), as well as the Real Time Transport Protocol (RTP) timestamp and sequence numbers to move the transmitted audio from one source to another without media renegotiation and delays. After the initial Invite message in accordance with the Session Initiation Protocol (SIP) to establish the call, there are no subsequent re-invites. If there is a subsequent re-invite, this requires a renegotiation of media, which is not the function of the system and method. In accordance with non-limiting examples, the system and method keep the RTP timestamp and sequence numbers seamless so that the RTP communications session between the communications server and the caller (or user) is consistent with the RFC (Request For Comments) requirements, for example, that following the SIP and other protocols. The communications system and method can work with external media servers not part of any communications server or device or internal media servers that are integrated with any communications server or device.

A communications session begins with a call into the communications server. The timestamp and sequence numbers each start with semi-random numbers. If the system desires to switch the audio the caller is hearing to another stream without renegotiating the session, the system will modify the RTP headers to keep the timestamp and sequence numbers synchronized with the current numbering between the communications server and the caller.

Figure 1:
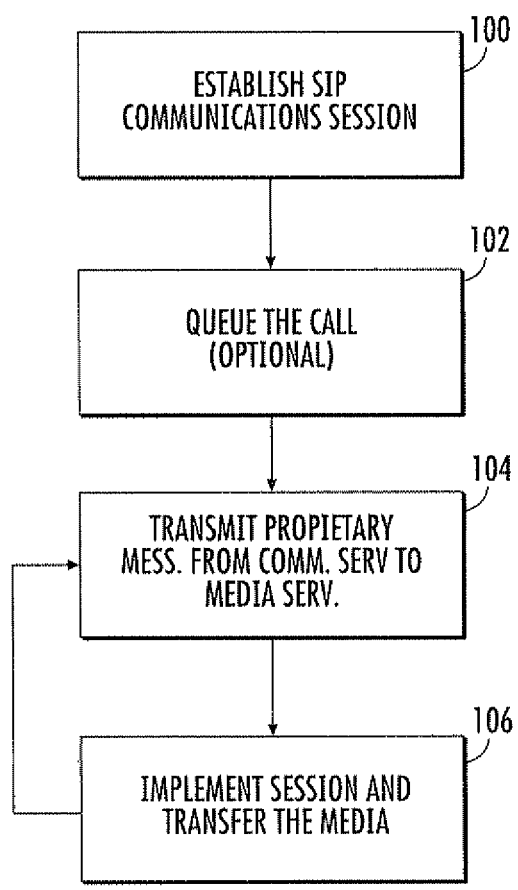
FIG. 1 is a high-level flowchart showing a method that can be used in accordance with a non-limiting example.
Figure 2:
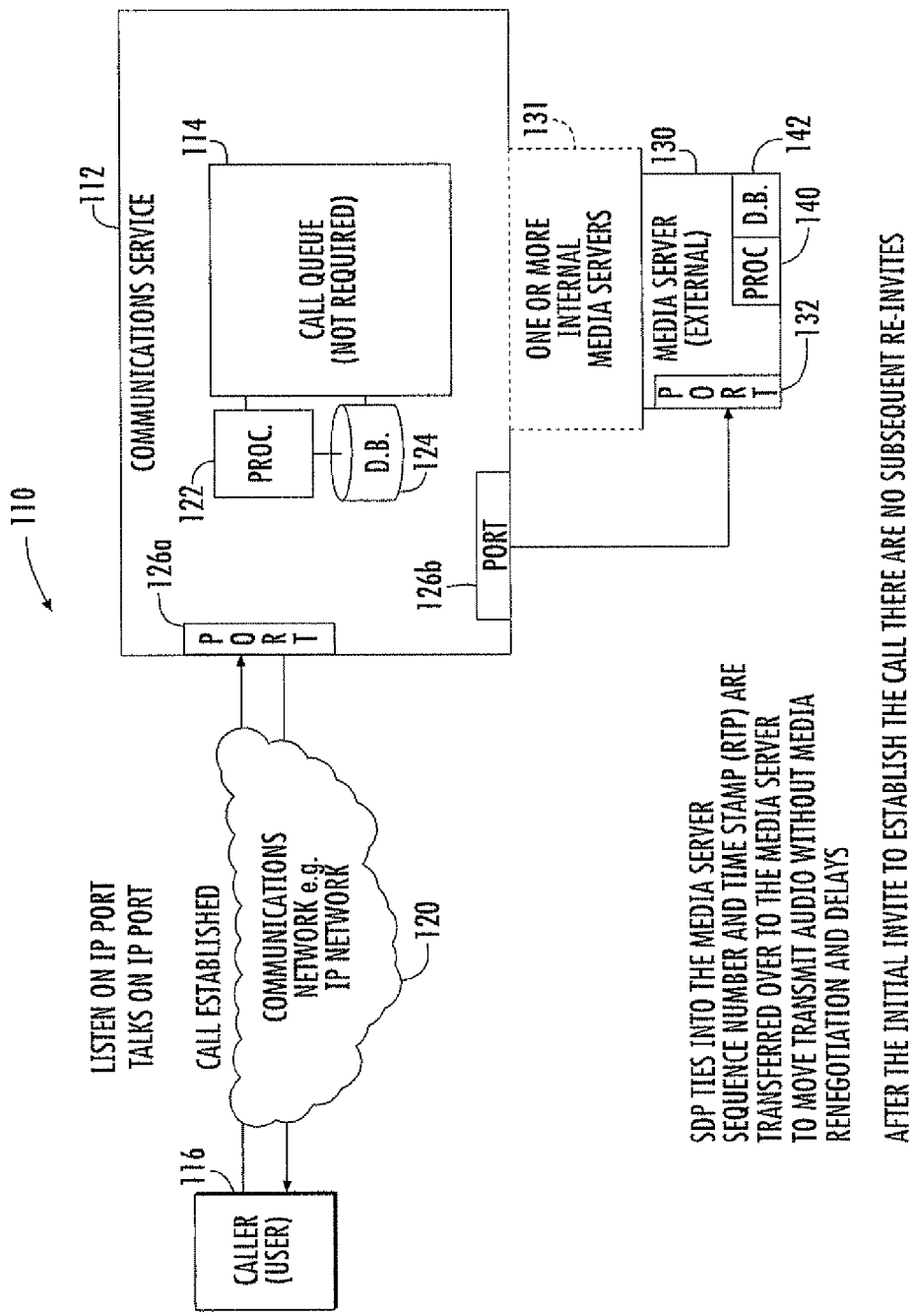
FIG. 2 is a high-level block diagram showing a communications system having a communications server and media server through which the method shown in FIG. 1 can be applied in accordance with a non-limiting example.

FIG. 1 is a high-level flowchart of an example method that can be used with the system shown in FIG. 2 in accordance with a non-limiting example that addresses these issues identified above. As shown at block 100, a Session Initiation Protocol (SIP) communication session is established between a user, such as a user of an SIP phone or other IP device (and also referred to as the caller), and the communications server. In one non-limiting example as shown in block 102, the call is queued. Queuing is not a necessary step, however, but is optional.

A message is transmitted from the communications server to the media server and includes in one non-limiting example the Session Description Protocol (SDP) parameters for media provided by the media server at the communications server (block 104). This message is not an SIP re-invite message. Instead, in one example, it is a proprietary message such that renegotiation is not required and the SIP re-invite command is not used (no further invite is necessary). The session is implemented and media delivered to the user in a packet format in accordance with a Real Time Transport (RTP) protocol to use the same network socket as the source IP and port numbers and update RTP timestamps and sequence numbers. The media is thus transferred to the user with minimal jitter buffer flushes and network resource usage (block 106). As a further option, if queuing is employed, some time might expire and music-on-hold and/or sales-on-hold media might change. Therefore several cycles of 104 to 106 might occur within the same session as shown by the arrow from 106 to 104. For example, in the queue the user might hear a prompt then the media might change to music. The user might then hear a new prompt and then different music and so on. For each transition, this solution eliminates a re-invite and improves audio quality and optimizes resource usage.

FIG. 2 is a block diagram of a communication system 110 as a high-level block diagram that includes use of a communications server 112 such as a NetVanta 7000 series as manufactured by ADTRAN, INC. The communications server (including a preferred NetVanta 7100) operates as a switch in one aspect and includes a call queue 114. It should be understood that the call queue 114 is not required in this non-limiting example. The caller 116 could be located at a VoIP or SIP phone or other type of communications device, including a landline or wireless device and communicates with the communications server 112 through the communications network 120, which in this example communicates using a Session Initiation Protocol (SIP) communications protocol and VoIP in accordance with a non-limiting example. The communications server 112 as a NetVanta device in this example includes a processor 122 and database 124 for functionality of this device and communicates through the appropriate communications ports 126a, 126b to the network 120. The media server 130 is shown in communication with the communications server through the port 126b at the server and through a media server port 132. The media server includes the appropriate processor 140 and database 142 for storing media files. The media server can be separate or integrated and share processing resources and storage with modules and components of the communications server in another example.

In the system as illustrated, the communications between the caller (user of the phone device) 116 and the communications server 112 provide capability for listening and talking on the IP port and establishing the call. Any communications in accordance with SDP tie into the media server 130 and the sequence number and timestamp (RTP) are transferred over to the media server to move transmitted audio without media renegotiation and delays. After the initial invite to establish the call, there are no subsequent re-invites.

In the system and method as described in the example, a Session Initiation Protocol (SIP) communications session call is established between the caller 116 and the communications server 112 using any necessary SIP protocol and Invite messages. The call typically is queued in the queue 114, which could be part of the database 124 (but that queue is not necessary as noted before). Any need for media data files, such as data files representing music-on-hold or sales-on-hold as non-limiting examples, would benefit when the communications session is connected to the unit or server corresponding, for example, to the communications server and not to a third party behind the unit or server. The communications server 112 transmits to the media server a message that is a proprietary message in this non-limiting example and includes Session Description Protocol (SDP) parameters for media provided by the media server 130 at the communications server 112.

The media server 130 and the communications server 112 use this communication of the proprietary message with the SDP parameters in order to provide the media stream without imposing a "hit" in the jitter buffers or requiring the use of a re-invite message using the SIP. Thus, the media server does not have to be "on-the-box" corresponding to the communications server, for example, a NetVanta 7000 series integrated communications platform with different functionality as described before. The session is implemented and media delivered to the user or caller in a packet format in accordance with the Real Time Transport Protocol (RTP) and reuses the same network socket as the source IP and port numbers and updates RTP timestamps and sequence numbers and transfers the media to the user with minimal jitter buffer flushes and network resource usage. The network socket is also termed internet socket as an endpoint and typically includes a socket address as a combination of an IP address and a port as a single entity. It usually includes a protocol, local socket address and remote socket address. Any operating system can forward IP packets to a corresponding application or service process and use the socket address information from the IP and transport protocol headers.

Figure 3:
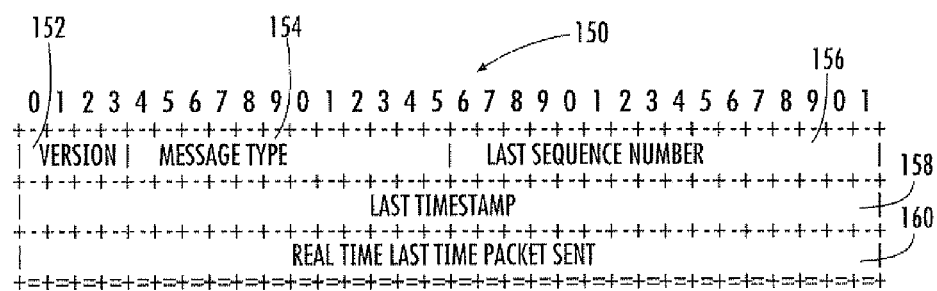
FIG. 3 is a packet format diagram of the proprietary message that can be used in accordance with a non-limiting example.

A socket can typically have a unique integer number as a socket number or socket identifier. It could be referred to as a local socket address as a combination of an IP address and port number. In RFC147, it was specified as a 32-bit number. FIG. 3 shows such 32-bit layout for a proprietary message as will be explained below. As to a port, it is an endpoint to a logical connection and a technique for a client program to specify a specific server program on a computer in a network in a non-limiting example. It can be referred to as a communications endpoint with a specific point identified by its number as a port number and the IP address and protocol used for communication. As noted before concerning 32-bit lengths, an RTP header is often set forth with 32-bits in its format layout.

SDP is a format typically used for describing the streaming media initialization parameter in an ASCII string. It describes the different multimedia communication sessions, including announcement and invitation and negotiation. SDP commands are used for negotiation between the endpoints of media types and not for communicating the data itself. The data is transported in a packet format in accordance with the Real-Time Transport Protocol (RTP). In this description, the term RTP packet is used to describe those packets that are transmitted using RTP. In this description, RTP is a standardized packet format for delivering audio and video over an Internet and involves typically streaming media. The packets can carry media streams controlled by H.323 and the Session Initiation Protocol (SIP) signaling protocols. RTP allows end-to-end, real-time transfer of the multimedia data.

In RTP, the sequence number is typically 16 bits and increments by one for each RTP data packet while the timestamp reflects the sampling instant of the first octet in the RTP data packet. By implementing the session and delivering media to the user in this packet format, it is possible to reuse the same network socket as the source IP and port numbers and update RTP timestamps and sequence numbers and transfer the media to the user with minimal jitter buffer flushes and network resource usage.

The media server could be "on the box," i.e., integrated with the communications server, instead of external to that device. The timestamps and sequence numbers can be negotiated for packets and thus this methodology as described becomes seamless. The audio is passing through the RTP streams with the updated sequence numbers and timestamps to make consecutive across the switchovers. It should be understood that buffering can be in the phone at the caller (phone).

In one non-limiting example, the system 110 can integrate media servers to the communications server as illustrated by the dashed lines at 131, which are representative of a number of different media servers that are internal to the communications server. Thus, it is possible to use elements in C data structures passed as a message between internal media servers. When switching between media servers, the system passes the information about the last RTP packet sent to the caller by the previous media server. The system knows where the new media server should start its timestamps and sequence numbers. The system passes the last RTP timestamp, sequence number and the real time of the last packet sent. Because it knows the actual time the last packet was sent, the new media server can determine how much to increment the last timestamp it was provided. The sequence number is easier to deal with the system 110 because it is simply incremented and does not have to take the passage of time involved in the switchover of media servers. FIG. 3 shows the diagram of an example packet format that includes this information as an example to be used for the proprietary message described above.

The proprietary message 150 format is shown in FIG. 3 and also referred to as "packet." A non-limiting example of the packet 150 includes various data fields corresponding to the packet version 152, message type 154, and last sequence number 156, each having a specified bit length as illustrated. It should be understood that the bit length can vary as necessary. A 32-bit example is illustrated. The data field for the last timestamp 158 is illustrated and the data field for packet real time and last time the packet was sent 160 is illustrated.

Figure 4:
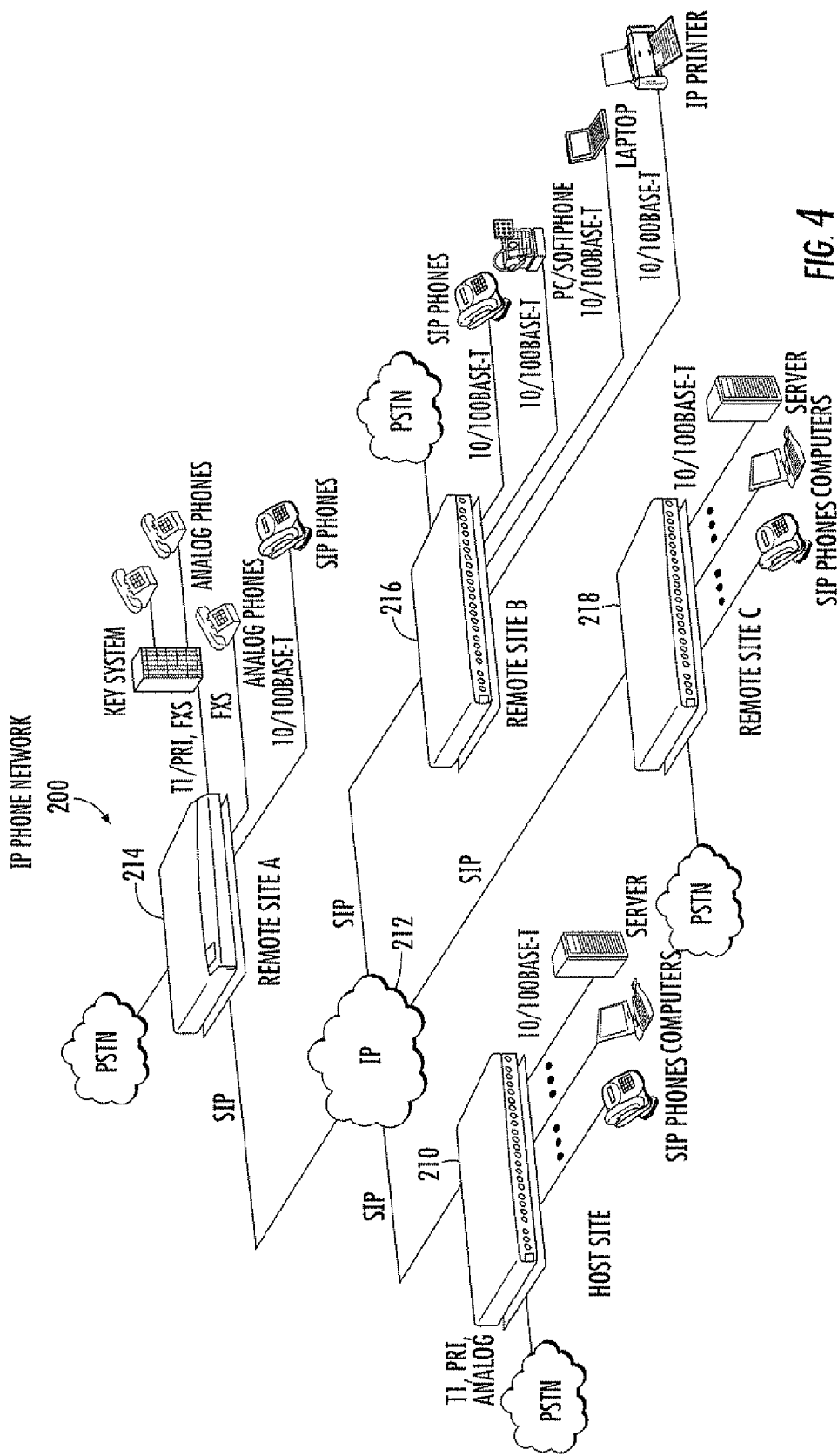
FIG. 4 is an example of a communications system that can use the method as described and incorporate components of the communications system shown in FIG. 2 in accordance with a non-limiting example.

There now follows a general description of a larger IP phone network as a general description to show a more specific and larger network example to which the example can be applied. FIG. 4 is a system diagram of an Internet Protocol (IP) telephone system 200 that includes various network components and devices as shown in FIG. 2 and other interconnected platforms, switches and servers. It should be understood that the system 200 shown in FIG. 4 is only one non-limiting example of an IP telephone system that uses an example network device as communications server 210 such as a NetVanta 7000 series server for different functions, including a switch. This series of devices can include a NetVanta 7100 device as manufactured by ADTRAN, INC. of Huntsville, Ala. In one aspect, the NetVanta 7100 is a communications server as an all-in-one office-in-a-box that provides voice and data solutions, including Private Branch Exchange (PBX) functionality.

FIG. 5 shows the communications server 210 (such as the NetVanta series 7000/7100) connected to an IP network 212, which uses SIP communications to various remote sites (A-C), which each include other devices that could operates as a communications server. Each of the remote sites includes a network device 214, 216, 218 of remote sites A, B and C respectively, that operate as communications servers such as IP business gateways. For example, remote site A could include an IP gateway device 214 such as the Total Access 900 manufactured by ADTRAN, INC. of Huntsville, Ala. Remote site B could include a NetVanta 6355 as an IP gateway device 216. Remote site C could include another communications device 218 similar to that at the host site, which includes a NetVanta 7100 device. These are only examples for purposes of description. All of these communications devices operate as network switches and include other functionality. For example, the device 214 at remote site A connects to a key system and various analog phones through a communications system and an SIP phone. The device at remote site A also connects to a PSTN. The device 216 at remote site B connects to the PSTN and an SIP phone, a PC/soft phone, a laptop and an IP printer as illustrated in that network. The device 218 at remote site C connects to the PSTN and an SIP phone, a computer and a server. The host site connects to the PSTN and also SIP phones, computers and a server through various communications connections and ports as illustrated.

There now follows a more detailed description of the communications server 210 as shown at the host site and described as a NetVanta 7000 series, and in this particular example, as a NetVanta 7100 for purposes of general understanding and description. This description can apply to other devices at the other remote sites.

In this device as the communications server 210, a single chassis can provide a LAN-to-WAN infrastructure and Quality of Service (QoS) that maintains voice quality and includes a Graphical User Interface (GUI) for network set-up and facilitate installation and system administration.

In this example, this communications server can allow a converged IP voice and data network with a full-function IP PBX for voice. It can include an integrated Power Over Ethernet (POE) switch-router for data in an integrated device and a Virtual Private Network (VPN) for secure internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules could include T1 and ADSL Network Interface Modules (NIMs). Analog (FXS, FXO) Voice Interface Modules (VIMs) can be included with T1, PRI voice interface modules and fiber SFP modules.

The communications server 210 in this example is an integrated communications platform and includes capability of a fast Ethernet switch with Gigabit uplinks and expansion slots for the network interface modules and voice interface modules. The IP telephone system 200 as illustrated includes voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. The device can operate as an integral SIP gateway with the appropriate FXS and FXO analog interfaces to support analog phones, fax machines, modems and credit card readers. The integrated voice mail can include 3,000 messages on eight ports and multi-level auto-attendant that are multi-level on eight ports in the example of the NetVanta 7000 series. The device includes, in one example, a full function IP access router and an integrated state inspection firewall protects against the Denial-of-Service (DOS) attempts. The devices include IP Sec VP and tunnelling with DES/3DES/AES encryption and an SIP-aware firewall, and include T.38 support and a door relay, music-on-hold (MOH) interfaces and Voice Quality Monitoring (VQM).

SIP networking is supported between multiple locations such that a business can connect multiple sites and have three or four digit dialing and local call routing and survivability and on-net calls for toll bypass. Multiple SIP trunks allow one communications server to connect to other communication servers, which may each be formed as a NetVanta 7000 series device or Total Access series device. Up to ten or more remote SIP trunks can be supported and connect to all endpoints at all locations such that a user can have local voice mail and auto-attendant services. A hub and spoke SIP network can be accomplished in another example. A dedicated communications server such as shown in FIG. 2 and also used in the IP phone system of FIG. 4 can aggregate SIP trunks at a central location, which for qualified applications, increases the number of other communication servers that can be networked together.

The user can use an Internet Protocol (IP) phone such as an IP 700 series of telephones with six or twelve line versions and support multiple call functions. It is possible to incorporate voice mail-to-email applications and personal auto-attendant in which each phone sets up their own automatic attendant. It is also possible for the communications server to ring a series of stations and one external phone number. The server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for the communications server to work in a multi-vendor environment and with an integrated T1-PRI trunk to consolidate separate voice lines and Internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of distributing media, comprising:
    establishing a Session Initiation Protocol (SIP) communications session call between a caller and a communications server;
    transmitting from the communications server to a media server a message that comprises Session Description Protocol (SDP) parameters for media to be provided by the media server without renegotiating the session call;
    delivering the media to the caller in a packet format in accordance with the Real Time Transport Protocol (RTP) and reusing the same network socket as source IP and port numbers and updating any RTP timestamps and sequence numbers;
    forming a proprietary message to include the SDP parameters for the media provided by the media server, a data field comprising a last sequence number for the RTP packet, a data field comprising a last timestamp for the RTP packet, a data field comprising a real time and last time as to when the RTP packet was sent, and a data field comprising a version and message type for the RTP packet; and
    transmitting the proprietary message to the media server.

2. The method according to claim 1, further comprising, transmitting the message to the media server without an SIP re-invite message.

3. The method according to claim 1, further comprising, queuing the call established between the caller and the communications server.

4. The method according to claim 1, further comprising, forming the media to be communicated as data representative of music-on-hold or sales-on-hold.

5. The method according to claim 1, further comprising, forming the communications server as an integrated communications platform having Private Branch Exchange (PBX), Virtual Private Network (VPN), and Voice over IP (VoIP) switch/routing functionality.

6. The method according to claim 5, further comprising, integrating the media server with the integrated communications platform.

7. The method according to claim 1, further comprising determining how much to increment a last RTP timestamp the media server was provided and incrementing the last RTP timestamp.

8. A communications system, comprising:
    a communications server configured to establish a Session Initiation Protocol (SIP) communications session call with a caller;
    a media server in communication with the communications server and configured to store media to be delivered to the caller;
    wherein said communications server is configured to transmit to the media server a message that comprises Session Description Protocol (SDP) parameters for media to be provided by the media server without renegotiating the session call and receive the media from the media server and deliver the media to the caller in a packet format in accordance with the Real Time Transport Protocol (RTP), said communications server configured to reuse the same network socket as source IP and port numbers and update RTP timestamps and sequence numbers; and wherein said communications server is configured to form and transmit, to the media server, a proprietary message that comprises the SDP parameters for media provided by the media server, a data field comprising a last sequence number for the RTP packet, a data field comprising a last timestamp for the RTP packet, a data field comprising a real time and last time as to when the RTP packet was sent, and a data field comprising a version and message type for the RTP packet.

9. The communications system according to claim 8, wherein the communications server is configured to transmit the message to the media server without an SIP re-invite message.

10. The communications system according to claim 8, wherein said communications server comprises a call queue and said communications server is configured to queue the call from the caller within the call queue.

11. The communications system according to claim 8, wherein the media to be communicated comprises data representative of music-on-hold or sales-on-hold data.

12. The communications system according to claim 8, wherein the communications server comprises an integrated communications platform having Private Branch Exchange (PBX), Virtual Private Network (VPN), and Voice over IP (VoIP) switch/routing functionality.

13. The communications system according to claim 12, wherein the media server is integrated with the integrated communications platform.

14. The communications system according to claim 8, wherein said communications server is configured to determine how much to increment a last RTP timestamp the media server was provided and increment the last timestamp.

* * * * *